United States Patent [19]

Clark

[11] Patent Number: 4,502,904
[45] Date of Patent: Mar. 5, 1985

[54] METHOD AND APPARATUS FOR APPLYING SPLICING TAPE WITH POSITIVE AIR PRESSURE ASSIST

[75] Inventor: Richard L. Clark, Burlington, N.C.

[73] Assignee: American Multimedia, Inc., Burlington, N.C.

[21] Appl. No.: 424,284

[22] Filed: Sep. 27, 1982

[51] Int. Cl.³ .................... B31F 5/06; B65H 69/06
[52] U.S. Cl. ................... 156/157; 156/304.3; 156/497; 156/506; 156/518; 156/519; 156/568; 242/56 R; 242/58.5
[58] Field of Search ............... 156/157, 304.3, 502, 156/505, 506, 517, 519, 497, 521, 568, 518, 520, 497; 242/56 R, 58.5

[56] References Cited

U.S. PATENT DOCUMENTS

| | | | |
|---|---|---|---|
| 2,949,148 | 8/1960 | Rayburn et al. | 156/521 |
| 3,625,799 | 12/1971 | Way | 156/518 |
| 3,717,057 | 2/1973 | Takimoto | 156/505 |
| 3,737,358 | 6/1973 | King | 156/506 |
| 3,939,031 | 2/1976 | Takimoto | 156/505 |
| 3,960,641 | 6/1976 | Pedersen | 156/568 |
| 4,052,249 | 10/1977 | Bruce et al. | 156/529 |
| 4,230,520 | 10/1980 | Morgan | 156/506 |
| 4,328,066 | 5/1982 | Kiuchi et al. | 156/506 |

FOREIGN PATENT DOCUMENTS 804998 1/1969 Canada .
2751236 5/1979 Fed. Rep. of Germany .

Primary Examiner—Michael Wityshyn
Attorney, Agent, or Firm—W. Thad Adams, III

[57] ABSTRACT

An audio tape cassette winder (10) is disclosed which includes a splicer (30) which winds splicing tape ("T") onto a cassette ("C"). Tape ("T") is applied by means of a square applicator wheel 85 which simultaneously translates and rotates into and out of tape applying contact with two tape ends ("L" and "A") to be spliced. Application of tape ("T") to tapes to be spliced ("L" and "A") is assisted by positive air pressure through ports (106a-d) on respective tape carrying surfaces (85a-d) as each tape carrying surface successively applies tape ("T") to the tapes to be spliced ("A" and "L"). The positive air pressure is applied only for a very short period of time concurrent with physical impact of successive tape carrying surfaces (85a-d) with the tapes to be spliced ("A" and "L"). The invention proceeds substantially as described above with reference to the apparatus.

11 Claims, 18 Drawing Figures

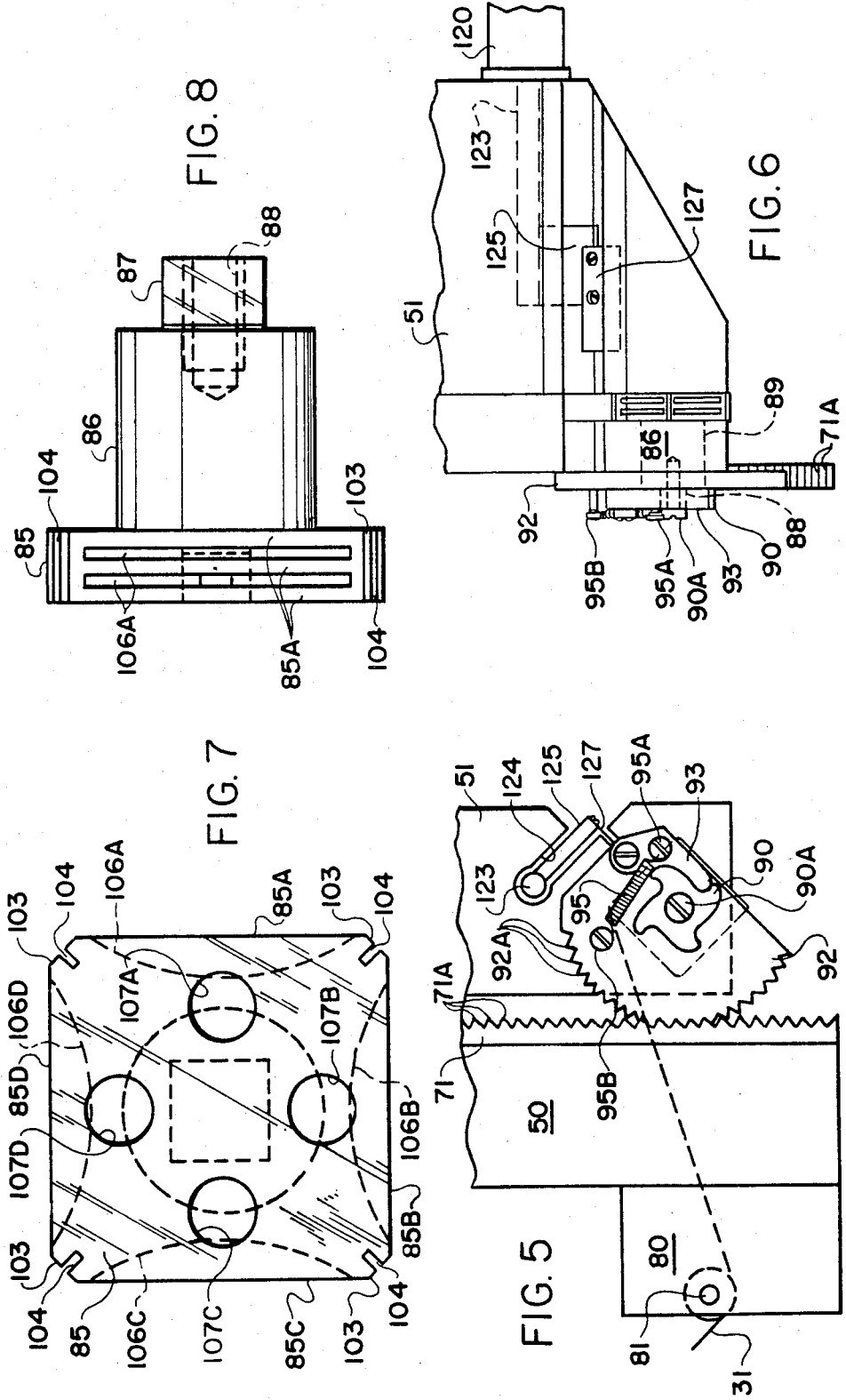

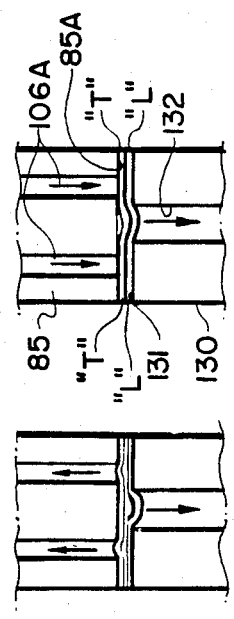
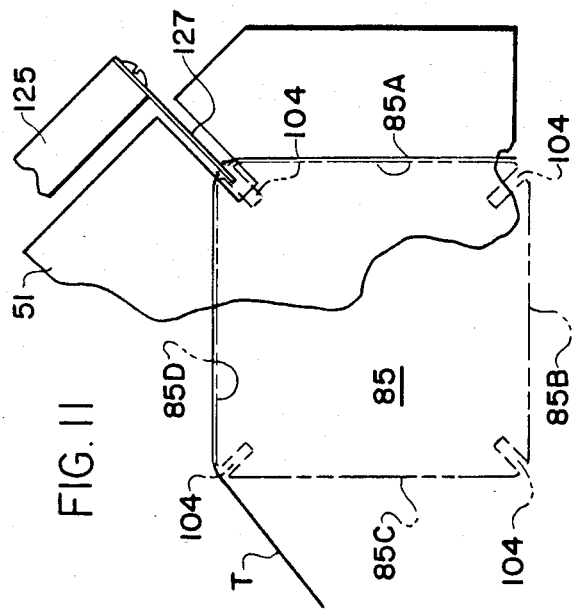
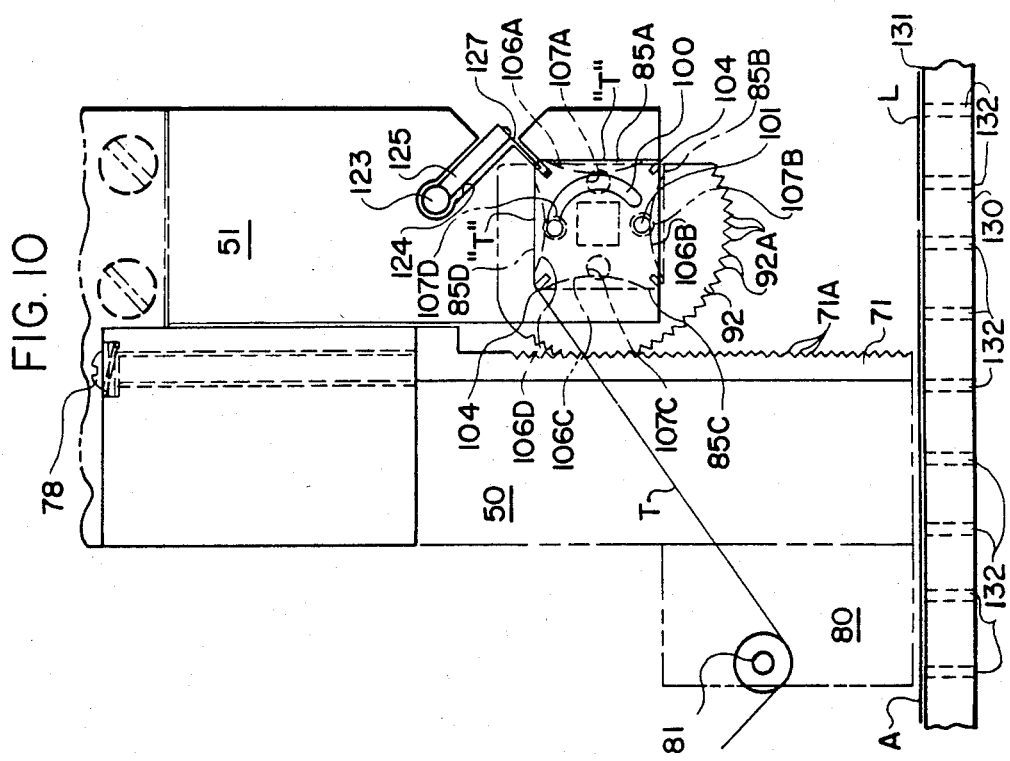
FIG.16 PRIOR ART    FIG.17
FIG.11
FIG.10

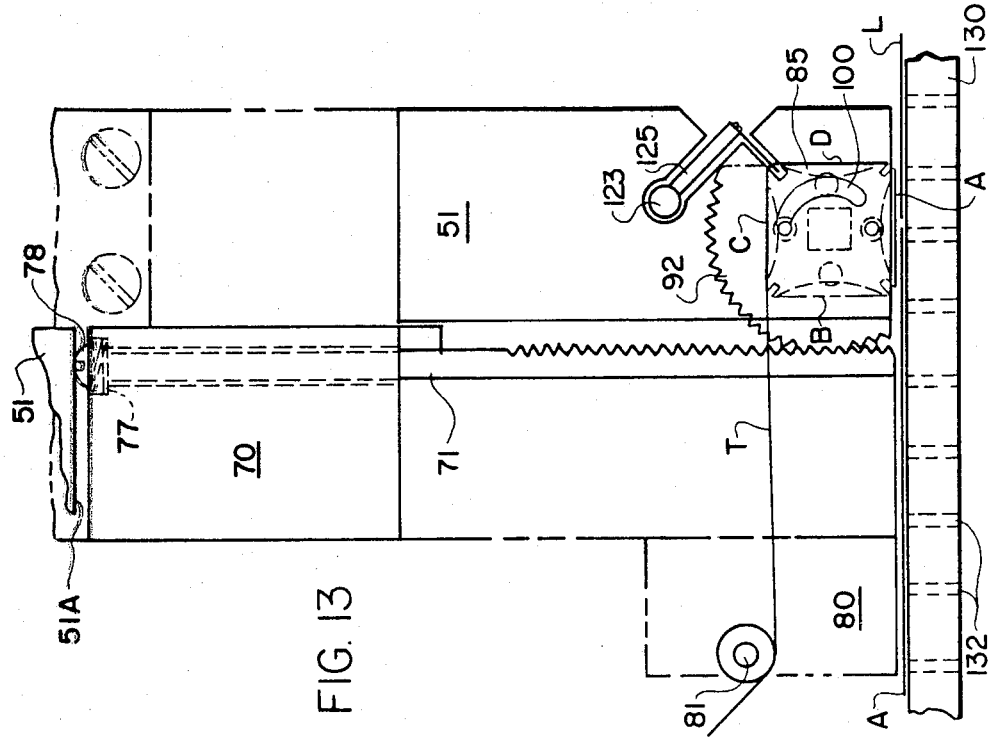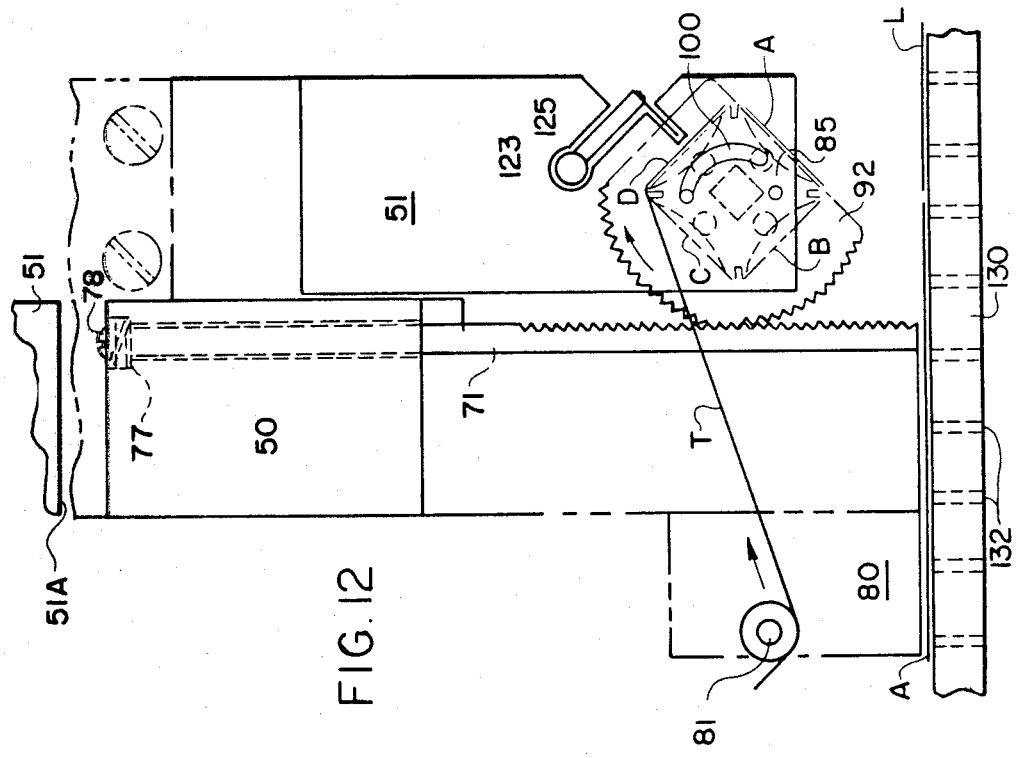

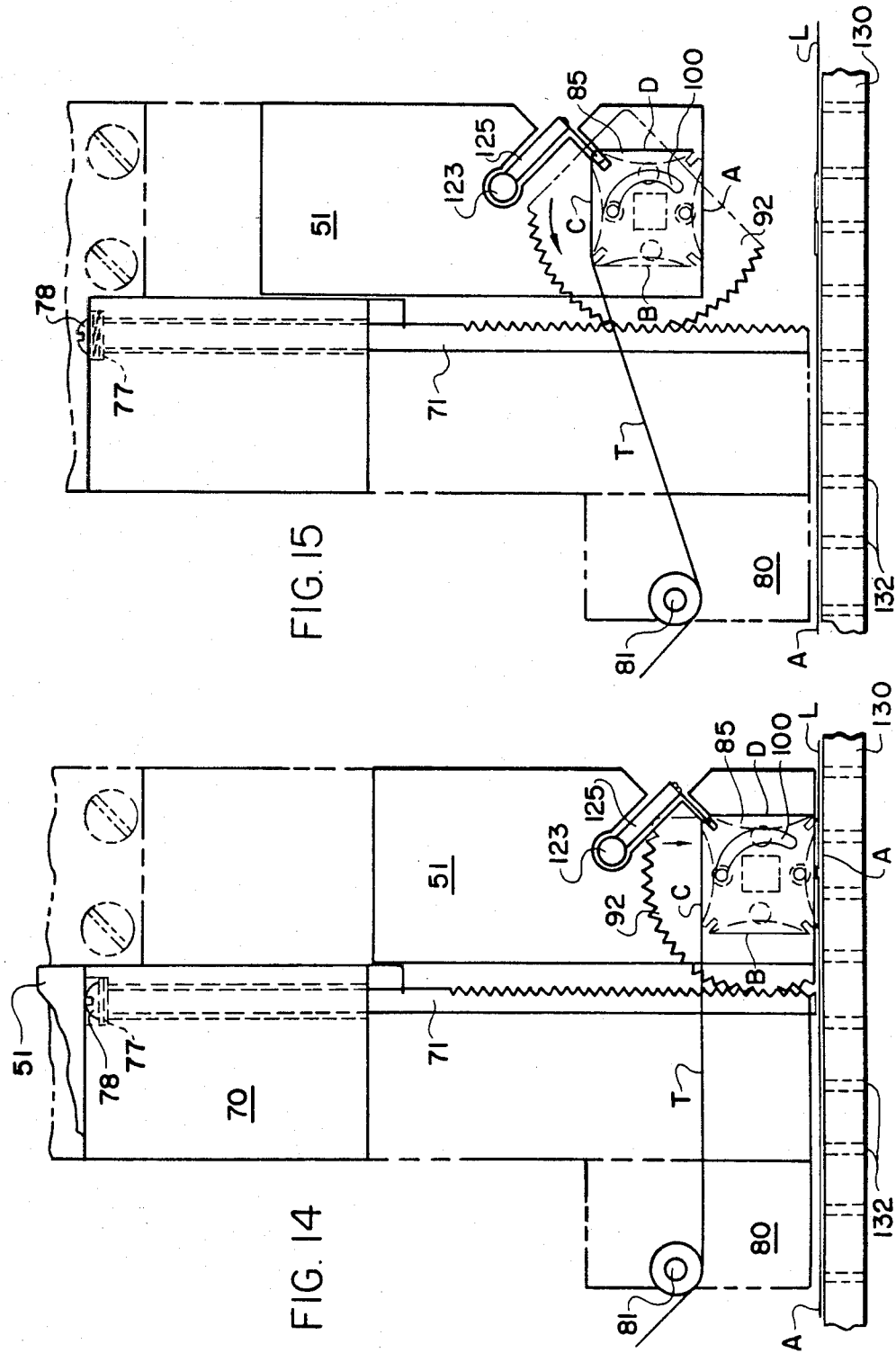

METHOD AND APPARATUS FOR APPLYING SPLICING TAPE WITH POSITIVE AIR PRESSURE ASSIST

TECHNICAL FIELD AND BACKGROUND OF THE INVENTION

This invention relates to a method and apparatus for applying splicing tape to two adjacent tape ends which includes means for applying positive air pressure to the splicing tape during its application. The invention has application in processing audio or video tape, photographic film and similar products. As described below, the splicing tape may be applied by an applicator wheel which reciprocates into and out of contact with the tapes to be spliced. Means are provided which urge the splicing tape into intimate contact with the two tapes to be spliced by means of positive air pressure. The air pressure enables the splicing tape to conform to any irregularities or deformation in the two tapes to be spliced thereby creating a stronger splice.

The particular disclosure of this application is to a splicing apparatus mounted on a high-speed audio cassette winder. A standard audio cassette comprises a plastic shell within which are mounted two rotatable spools. When purchased by the user, the cassette generally has a leader attached to each spool and a length of either blank or pre-recorded magnetic tape with its two ends attached to the respective lengths of leader. One way of winding the blank or pre-recorded tape into the cassette is to begin with a cassette consisting of a shell with two spools and a single, short length of leader tape—one end connected to one spool and the other connected to the other spool. The cassette is fed into an automatic, high-speed tape winder which extracts the leader tape from the tape winder which extracts the leader tape from the tape opening in the bottom of the shell and cuts the leader tape into two separate lengths, each attached to one of the spools. One of the leaders is held momentarily while the other leader is placed on a splicing bed. The splicing bed usually comprises a trough with a somewhat greater width than that of the tape, with a longitudinally extending series of vacuum ports communicating with the bottom of the trough.

The leader is mechanically placed in the trough and held in position by suction from the ports. By one of several methods the end of the magnetic tape is manipulated into the splice bed with its free end in abutment with the end of the leader. Suction also holds the magnetic tape momentarily stationary. The exact point of abutment between the recording tape and leader end should be directly below a splicing mechanism which applies an overlapping length of splicing tape across the abutment. The spool to which the newly spliced leader is attached is then rotated at high speed, thereby winding a pre-determined length of tape onto the spool. The magnetic tape is then cut and the tail of the tape just wound onto the spool is spliced to the other end of leader which was momentarily held out of position. Any remaining slack in the tape is taken up and the cassette is ejected. Another empty cassette takes its place and the same process is repeated.

If the splice is not properly made, the leader an separate from the tape during subsequent winding or rewinding, rendering the cassette unusable. In order to ensure that the tape and leader do not separate, the adhesive splicing tape must be adequately adhered to both leader and tape. The more intimate the surface-to-surface contact, the greater stress the splice will withstand. As described above, the leader and recording tape are both held in stationary position to receive the splicing tape by means of suction on the bottom of the tapes. On conventional cassette winding machines, this suction is sufficiently strong to deform the tape downwardly somewhat, creating a number of circular depressions where the tape is drawn slightly into the individual suction ports. Since splicing tape is conventionally applied by means of impact with a metal applicator, the splicing tape is positioned flat on the splice bed. The splicing tape does not adhere to the depressions in the leader and recording tape caused by the suction ports. As a result, weak spots are created which can cause the splice to break under stress.

This problem is even more severe in the applications where suction is also used to hold the splicing tape to the tape applicator. In such cases deformation of the splicing tape occurs as well, meaning that depressions are formed by the suction on the splicing tape, causing the tape to not properly contact the leader or recording tape. Correspondingly larger weak spots are created due to the lack of intimate contact between the tapes, making separation of the splice even more likely.

SUMMARY OF THE INVENTION

Therefore, it is an object of the invention to provide a method and apparatus for securely applying splicing tape to two ends to be spliced in order to minimize the possibility of later separation of the splice.

It is another object of the present invention to provide a method and apparatus for securely applying splicing tape wherein positive air pressure is applied to the underside of the splicing tape as the splicing tape is applied to the tape ends to be spliced in order to assist in removing the splicing tape.

These and other objects of the present invention are achieved by providing an apparatus for applying adhesive splicing tape to two tape ends which comprises a source of splicing tape, a splicing tape applicator having at least one planar tape carrying surface and means for reciprocating the splicing tape applicator into and out of momentary contact with two tape ends positioned in splicing tape receiving relation to the splicing tape applicator. Port means communicate with the tape carrying surface of the splicing tape applicator and a source of positive and negative air pressure selectively communicates with the port. Air pressure control means apply negative air pressure through the port to the splicing tape to hold the splicing tape on the tape carrying surface until the instant of contact with the tape ends. Upon contact with the tape ends, the air pressure control means applies positive pressure through the port means to the splicing tape to aid in removing the splicing tape from the tape carrying surface and firmly adhering the splicing tape to the tape ends.

Preferably, the splicing tape applicator comprises a polygonal wheel having a plurality of peripheral tape carrying planar surfaces for holding the splicing tape. The polygonal wheel is preferably mounted for holding the splicing tape. The polygonal wheel is preferably mounted for simultaneous rotational and vertical movement into and out of contact with the two opposing tape ends.

The preferred method for applying splicing tape with a positive fluid pressure assist comprises the steps of releasably dispensing splicing tape onto a splicing tape applicator having at least one planar tape carrying surface with an underlying port therein; two opposing tape ends are closely positioned adjacent to and in longitudinal alignment with each other in splicing tape receiving relation to the splicing tape applicator. The splicing tape applicator moves momentarily into contact with the two adjacent tape ends thereby applying the splicing tape. Positive air pressure is directed from the underlying port against the underside of the splicing tape as the splicing tape is applied to the tape ends to aid in removing the splicing tape from the tape carrying surface of the splicing tape applicator and firmly adhering the splicing tape to the adjacent tape ends.

BRIEF DESCRIPTION OF THE DRAWINGS

Some of the objects of the invention have been set forth above. Other objects and advantages of the invention will appear as the description of the invention proceeds, when taken in conjunction with the following drawings, in which:

FIG. 5 is an elevational view of the splicer showing the details of the ratchet and pawl assembly of the applicator wheel and rack gear assembly;

FIG. 6 is the view shown in FIG. 5 from another angle;

FIG. 7 is a front elevational view of the applicator wheel according to the present invention;

FIG. 8 is a side elevational view of the applicator wheel according to the present invention;

FIG. 10 is a fragmentary side elevational view of the splicer according to the present invention;

FIG. 11 is a schematic view of the cutter blade assembly and applicator wheel showing cooperation therebetween;

FIG. 12 is a fragmentary side elevational view of the splicer during downward movement of the applicator wheel in the same position as in FIG. 5;

FIG. 13 is a fragmentary side elevational view of the splicer showing the applicator wheel with a tape-carrying face parallel to the tapes to be spliced;

FIG. 14 is a fragmentary side elevational view of the splicer as a length of splicing tape is applied to the two tapes to be spliced;

FIG. 15 is a fragmentary side elevational view of the splicer during reciprocation of the applicator wheel out of contact with the spliced tapes;

FIG. 16 is a schematic view showing interreaction of a hypothetical prior art splice bed and applicator wheel;

FIG. 17 is a schematic view showing cooperation of the vacuum on the splice bed and positive pressure on the applicator wheel cooperating to enhance contact between the splicing tape and the tapes being spliced; and, FIG. 18 is a schematic view of the pneumatic system, electronic control system and power supply of the splicer.

DESCRIPTION OF THE PREFERRED EMBODIMENT

Figure 1:
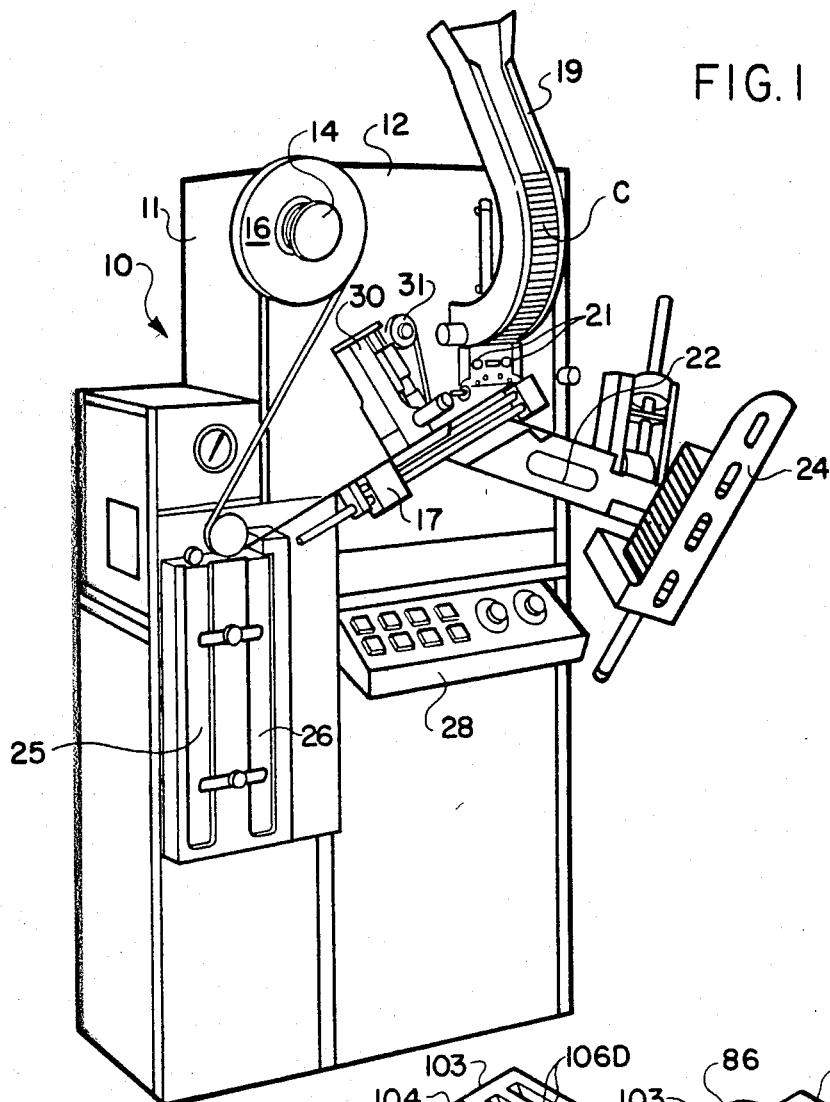
FIG. 1 is a perspective view of an audio cassette tape winder and attached splicing apparatus according to the present invention.

Referring now specifically to the drawings, an audio tape cassette winder is shown and generally designated at broad reference numeral 10. Winder 10 comprises a console 11 within which are mounted the major electrical, pneumatic and mechanical operating parts. Console 11 has a front cover 12 which supports a rotatably driven audio tape supply reel 14 onto which is wound a supply of magnetic tape 16; a tape leader extractor assembly 17; a cassette supply tray 19 which holds a plurality of cassettes "C"; a cassette winding spindle 21; a defective cassette rejector assembly 22; and a stacking trough 24 for finished cassettes. A pair of vacuum take-up columns 25 and 26 selectively exert a vacuum force on audio tape to positively control tape tension as it is unwound from the supply reel 14 and wound onto cassette "C" by cassette winding spindle 21. A control panel 28 enables the operator to manipulate various functions of winder 10. Finally, a tape splicing apparatus 30 according to the present invention is mounted on front panel 12 and dispenses adhesive splicing tape "T" from a supply spool 31.

Supply reel 14 may be wound with unrecorded audio tape which is then used to produce "blank" cassettes to be used for later recording. Alternatively, supply reel 14 may be wound with tape containing a series of identical recordings ("albums") of music, speech or other audio signals. A low frequency "Q" signal is recorded onto the audio tape between each album and indicates the end of one album and the beginning of the next. Therefore, in loading cassettes with pre-recorded tape, a "Q" signal sensor is provided which stops the movement of the tape and permits the tape to be severed between the albums. The various electrical, pneumatic and mechanical components used to drive the supply reel sense the presence of each "Q" signal, cut the audio tape between albums, extract the leader from each cassette and prepare the leader for splicing; wind each cassette with a pre-determined amount of audio tape and eject the cassette to make room for the next one are all part of the prior art and are not the invention per se of this application.

Patents examplary of the prior art referred to above include U.S. Pat. Nos. 3,717,314 and 3,753,834.

Figure 2:
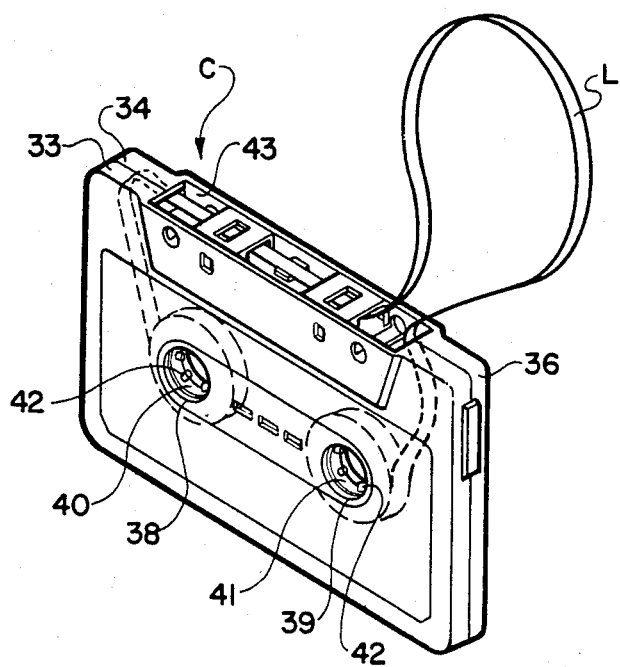
FIG. 2 is a perspective view of a conventional audio cassette.

The splicer 30 which will be described in detail below is operable for splicing a wide variety of tapes, sheets, films and the like. For illustrative purposes, splicer 30 will be described with reference to an industry standard audio cassette "C", as shown in FIG. 2. Cassette "C" comprises two case segments 33 and 34 which are mated together and adhered by adhesive or screws to form a cassette shell 36. Shell 36 has two through holes 38 and 39 between which are mounted, respectively, rotatable drums 40 and 41. Drums 40, 41 are provided with a plurality of teeth 42 around their inner circumference which mate with teeth on the winding spindle 21 of winder 10 and also with any standard recorder or playback unit. One end of a short length of leader "L" is attached to each of the drums 40 and 41. In this form cassette "C" is loaded into winder 10 and a pre-determined length of tape is wound onto either drum 40 or 41. Access to the tape is obtained through a bottom opening 43 in shell 36.

Figure 3:
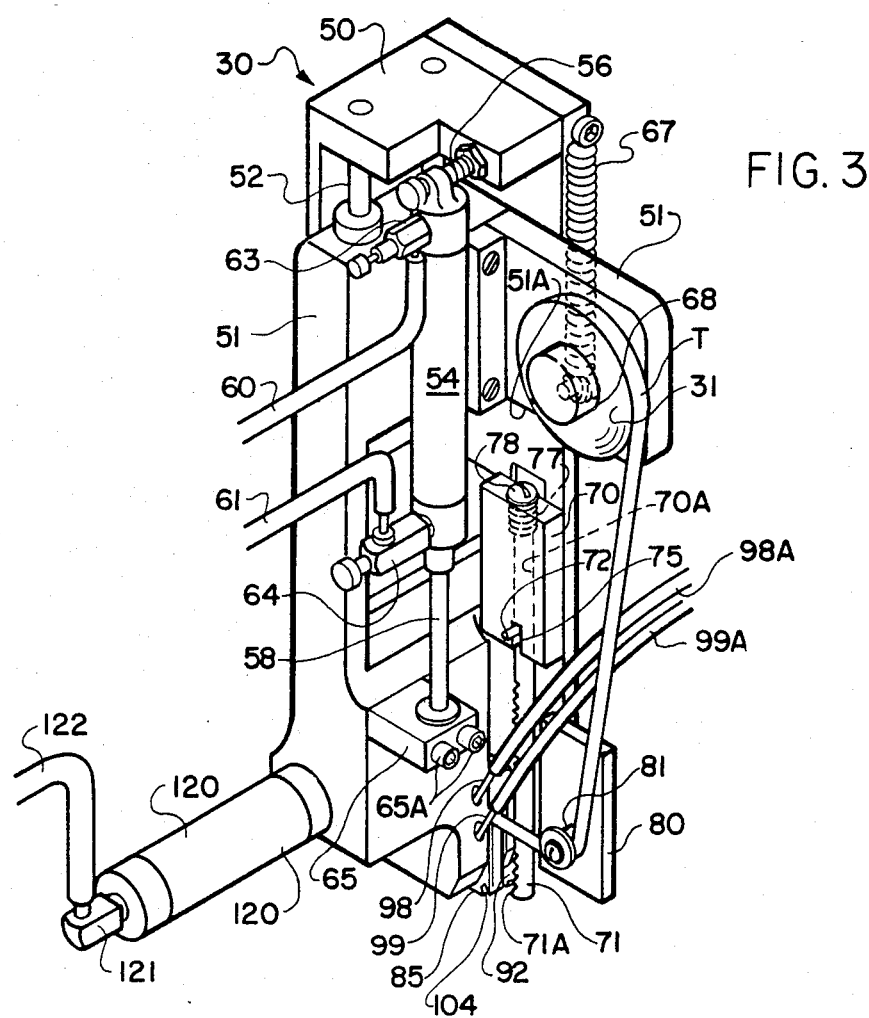
FIG. 3 is a perspective view of a tape splicer according to the present invention.

Referring now to FIG. 3, splicer 30 is mounted in a stationary position on front panel 12 of winder 10 by means of a base, referred to as a splicer support block 50. A splice block 51 is mounted on splicer support block 50 for reciprocating up and down motion along a vertically extending splice block guide rail 52, carried by the upper end of splicer support block 50.

Reciprocating up and down motion of splice block 51 is effected by a two-way pneumatic splice cylinder 54 which is mounted to the splicer support block 50 by a splice cylinder mounting bolt 56. A splice piston rod 58 is slidably positioned in splice cylinder 54 and connected to a piston (not shown) for movement in response to air pressure within splice cylinder 54. Splice cylinder 54 is a two-way cylinder and is proivded with a down piston supply tube 60 and an up piston supply tube 61. Flow valves 63 and 64 cooperate with down piston supply tube 60 and up piston supply tube 61, respectively, to control the flow of air into the cylinder. Splice piston rod 58 is secured by the end remote from splice cylinder 54 to a piston rod mount 65 and is removable by loosening two screws 65a.

By introducing compressed air through down piston supply tube 60 into splice cylinder 54, piston rod 58 is extended outwardly from within cylinder 54, causing splice block 51 to move downwardly along guide rail 52. Introducing compressed air from up piston supply tube 61 into splice cylinder 54 causes piston rod 58 to be retracted within splice cylinder 54, and the attached splice block 51 to be moved upwardly.

Splice block 51 is assisted in its return to the upper position by a splice block return assist spring 67, the upper end of which is attached to the stationary splicer support block 50 and the lower end of which is attached to splice block 51. Spring 67 also reduced the force of the downward movement of splice block 51 under the combined influence of gravity and splice cylinder 54.

A spool 31 of splicing tape "T" is carried by a splicing tape spool mount 68 connected to and moving in unison with splice block 51.

A rack mounting block 70 is carried by the stationary splicer support block 50. An elongate rack 71 having a length of rack teeth along one side is positioned within a vertical bore 70a in rack mounting block 70 and is normally stationary with splicer support block 50. A rack alignment pin 72 extends radially outwardly from rack 71 and rides within a recess 75 in rack mounting block 70.

Rack alignment pin 72 keeps the rack teeth 71a properly aligned. Recess 75 permits rack pin 72 and consequently rack 71 to move in the vertical direction to a limited degree. Rack 71 is preferably provided with an enlarged head 78 on its upper end. Bore 70a has a sufficiently large diameter in its upper end to accommodate enlarged head 78 so that rack 71 can be urged downwardly until enlarged head 78 is flush with the upper surface of rack mounting block 70. Rack 71 is held in a normally raised position with enlarged head 78 exposed by means of a rack return spring 77. The purpose of this arrangement is described in detail below.

A guide bearing mount 80 is also positioned on the movable splice block 51 and carries a guide bearing mount 81. Adhesive splicing tape from splicing tape spool 31 is properly positioned for application by guide bearing 81 around which the splicing tape passes.

An applicator wheel 85 is integrally formed with a cylindrical mounting sleeve 86 and a concentrically formed, square ratchet mount bushing 87 having a screw receiving bore 88 therein. Applicator wheel 85 is mounted to splice block 50 by inserting mounting sleeve 86 in the annular bore 89. Bore 89 is sized so that mounting sleeve 86 is held by a slight press fit for rotation therein. Ratchet mount bushing 87 extends through the end of bore 89 opposite applicator wheel 85. A ratchet 90 is mounted on ratchet mount bushing 87. Since ratchet mount bushing 87 is square, the ratchet 90 and applicator wheel 85 always rotate in unison. Mounted between ratchet 90 and splice block 51 is a rack gear 92. As is best shown in FIG. 5, rack gear 92 is provided with gear teeth 92a around approximately a 90° arc, which teeth 92a mate with teeth 71a on rack 71. Rack gear 92 therefore operates as a motion transmitting body which converts vertical movement of splice block 51 relative to the stationary rack 71 into rotation of applicator wheel 85. A pawl 93 is mounted eccentrically on rack 92 and mates with notches between the wave-shaped teeth on pawl 93. Pawl 93 is normally held in mating enagement with ratchet 90 by means of spring 95 tensioned between a screw 95a on pawl 93 and a screw 95b on rack gear 92.

Ratchet 90 is retained on ratchet mount bushing 87 by means of a ratchet mounting screw 90a which is threaded into screw bore 88.

Counterclockwise rotation of rack gear 92 during upward movement of splice block 51 causes pawl 93 to ride up over one of the wave-shaped teeth in ratchet 90. As a result, applicator wheel 85 is not forced to rotate. Conversely, downward movement of splice block 51 causes clockwise rotation of rack gear 92. (FIG. 5). Pawl 93 matingly engages one of the notches as ratchet 90 rotates. Therefore, applicator wheel 85 turns one-quarter turn during each downward movement of splice block 51.

Figure 4:
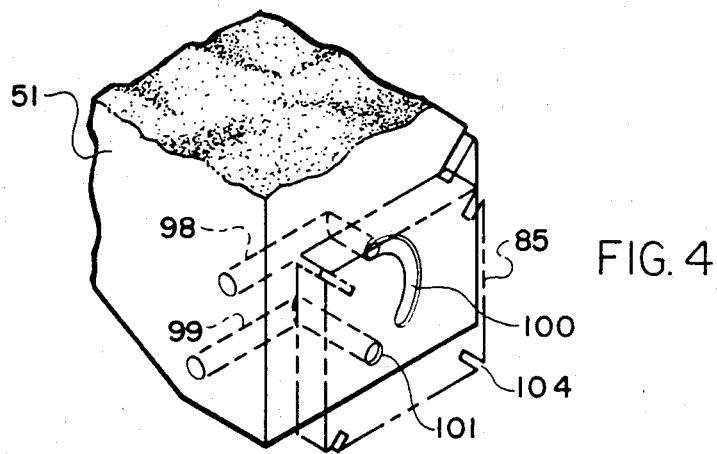
FIG. 4 is a fragmentary perspective view of the splicing tape applicator wheel and manifold.

As is shown in FIG. 4, splice block 51 is provided with two conduits, 98 and 99. Conduit 98 comprises a constant vacuum conduit which communicates with a flush surface of splice block 51 against which applicator wheel 85 sealingly engages and rotates. The constant vacuum conduit 98 communicates with a constant vacuum port manifold 100 which has a crescent shape. During operation of the winder, negative air pressure is constantly present in constant vacuum conduit 98 and constant vacuum port manifold 100. Variable pressure conduit 99 communicates with a variable pressure port manifold 101. As the name implies, pressure in conduit 99 and manifold 101 varies between negative pressure, positive pressure and atmospheric pressure as described in further detail below.

Figure 9:
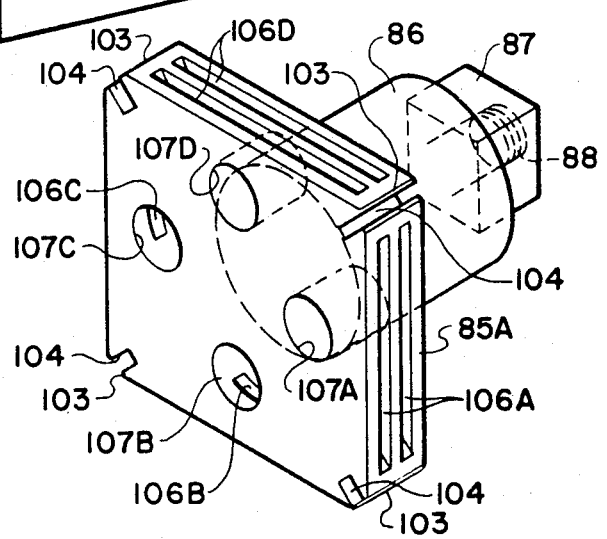
FIG. 9 is a perspective view of the applicator wheel according to the present invention.

Referring now to FIGS. 7, 8 and 9, applicator wheel 85 is substantially square. Each corner is truncated to provide a flat corner surface 103 into which is formed a cutter blade access slot 104. In the description that follows, the four sides of applicator wheel 85 will be arbitrarily referred to as 85a, 85b, 85c and 85d, respectively. Each of the four sides 85a–d comprise planar tape carrying surfaces. On each tape carrying surface 85a–d is formed a pair of ports 106a, 106b, 106c and 106d, respectively. Ports 106a–d are formed in the body of applicator wheel 85 so that they each define a radius and communicate with manifold access holes 107a, 107b, 107c and 107d, respectively. As is shown in FIG. 9, holes 107a–d communicate with one side of applicator wheel 85. This one side of applicator wheel 85 is fitted for rotation against the surface of splice block 51 into which the manifolds 100 and 101 are formed. Therefore, as applicator wheel 85 is rotated, one or more of the ports 106a–d communicate selectively with manifolds 100 and/or 101.

Tape "T" is applied to applicator wheel 85 in a continuous length. Therefore, the tape must be cut into appropriate length sections. This is accomplished by means of a reciprocating cutter blade assembly. Reciprocating movement is provided by a tape cutter cylinder 120 which is supplied with pressurized air through a nipple 121 by a cutting cylinder air supply tube 122 (FIG. 3). Referring to FIG. 6, tape cutter cylinder 120 moves a tape cutter piston rod 123 through a slot 124 formed in splice block 51. A blade carrier 125 carries a cutter blade 127. As is best shown in FIGS. 6 and 11, cutter blade 127 slides into one of the blade access slots 104 aligned therewith, cutting splicing tape "T" into a segment approximately the same length as each of the tape carrying surfaces 85a–d of applicator wheel 85. In the particular embodiment shown in FIGS. 1 and 6, the tape cutter cylinder 120 is a one-way cylinder with the tape cutter piston rod 123 being returned to its normal, retracted position by a spring (not shown). As is apparent, a two-way cylinder of the same type as the splice cylinder 54 could be used instead.

The two tape ends to be spliced are held in position by means of a splicing bed 130, the precise construction of which may vary considerably from one type of winder to another. In the preferred embodiment disclosed herein, the splicing bed 130 includes a planar, longitudinally extending upper surface 131. A plurality of longitudinally extending and spaced-apart ports 132 are formed in splicing bed 130 communicating with a source of suction (not shown) in a conventional manner. The two tapes to be spliced may be two lengths of audio or video recording tape, a length of leader to either audio or video recording tape, or any other of a wide variety of combinations of leader to tape, film or other substances. For purposes of illustration a length of leader tape "L" is shown positioned on the upper surface 131 of splicing bed 130 in abutting relation to a length of audio recording tape "A". As is shown in FIG. 10, the tapes very nearly abut at a point directly beneath applicator wheel 85 in splicing tape "T" receiving position.

Figure 18:
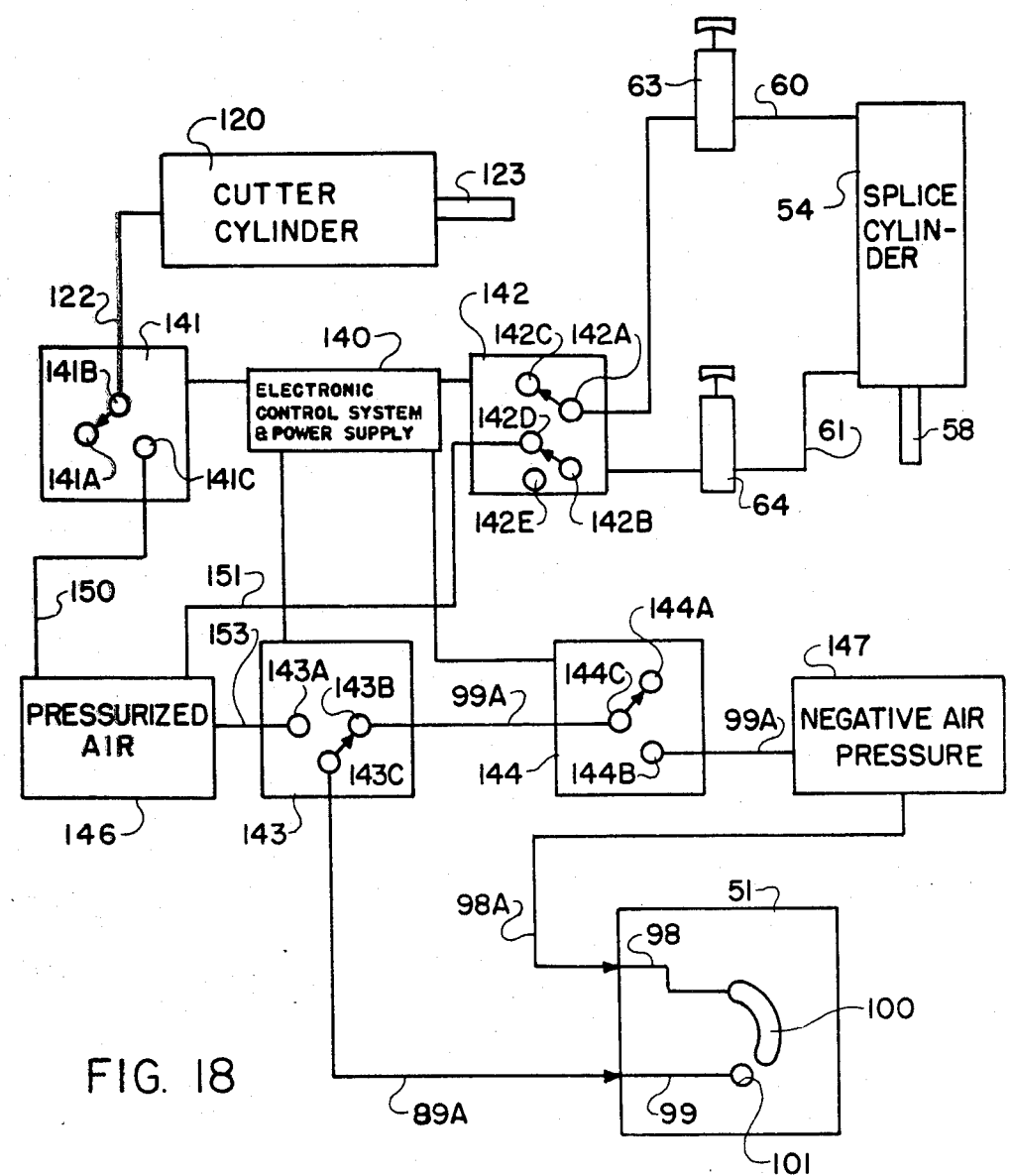

Positive and negative air pressure is provided by means of a pneumatic system mounted in winder console 11. Referring to FIG. 18, the pneumatic system comprises an electronic control system and power supply 140 of conventional design operatively connected to solenoid operated pneumatic valves 141, 142, 143 and 144. The system also includes a source of pressurized air 146 and a source of negative air pressure, or vacuum, 147.

Pressurized air source 146 is connected to valve 141 by conduit 150. Activation of the solenoid interconnects valve port 141b with valve port 141c causing pressurized air to extend the cutter piston rod 123. Return of solenoid 141 to its off position at valve port 141a causes the cutter piston rod 123 to retract, as described above. Pressurized air source 146 is connected to solenoid valve 142 by means of a conduit 151. Solenoid 142 activates the splice cylinder 54 in a downward direction by connection of valve port 142d to valve port 142a. Since splice cylinder 54 is a two-way operating cylinder, movement of the splice piston rod 58 upwardly into cylinder 54 thereby retracting splice block 51, takes place by interconnection of valve ports 142d and 142b. This position is shown in FIG. 18. "Off" positions 142c and 142e operate, respectively, to disconnect the inactive side of splice cylinder 54 from conduit 151.

A constant supply of vacuum is supplied by vacuum supply tube 98a which interconnects constant vacuum conduit 89a with negative air pressure source 147. Vacuum supply tube 98a is not directed through one of the solenoid valves. For this reason, vacuum is supplied to manifold 100 constantly during operation of the winder.

Solenoid valves 143 and 144 cooperate to supply variable air pressure to the variable pressure port manifold 101. Pressurized air is supplied to solenoid valve 143 by conduit 153 interconnected to valve port 143a. With valve port 143c interconnected with valve 143a, pressurized air is supplied to manifold 101. Negative air pressure is supplied to manifold 101 through solenoid valve 144. The variable pressure supply tube 99a interconnects valve port 143b and valve port 144c, and valve port 144b and the negative air pressure source 147. With solenoid 143 switched to interconnect ports 143c and 143b and with solenoid 144 switched to connect valve ports 144c and 144b, negative air pressure is supplied to manifold 101. When neither positive nor negative air pressure is desired in manifold 101, solenoid 144 is switched to connect valve port 144c with valve port 144a, shutting off all air flow and opening manifold 101 to atmospheric air pressure only.

The switching of the various solenoid valves is controlled by the programable electronic control system 140 of conventional design.

Operation of the splicer 30 begins with the mechanism in substantially the position shown in FIG. 10. Pressurized air is supplied by solenoid 142 to up piston supply tube 61 to splice cylinder 54. Splice block 51 is therefore in its raised position as shown in FIG. 3. Tape "T" is held on surfaces 85a and 85b of applicator wheel 85 by suction through ports 106a and 106d respectively. Suction is provided to ports 106a and 106d through the constant vacuum port manifold 100 from the negative air pressure source 147. While applicator wheel 85 is stationary and in the position shown in FIG. 10, the cutter cylinder 120 is activated by solenoid 141, extending cutter piston rod 123 and the attached cutter blade 127. Blade 127 extends into blade access slot 104 severing tape "T". Applicator wheel 85 is now ready to begin its downward travel into splice applying position.

Referring now to FIGS. 5 and 12, solenoid 142 has deactivated the up piston supply tube 61 and simultaneously activated down piston supply tube 60, conveying pressurized air to the top of splice cylinder 54, driving splice block 51 downwardly. As splice block 51 translates, i.e. moves vertically downwardly, this vertical movement is translated into unison clockwise rotary movement of rack gear 92. Because rack gear 92 is rotating clockwise, ratchet 90 and pawl 93 cooperate to cause simultaneous, unison rotation of applicator wheel 85. As is therefore illustrated in FIG. 12, tape applying surface 85a has rotated approximately 45° and is moving into position to apply a length of splicing tape to the abutted tapes to be spliced, "A" and "L". Splicing tape "T" is maintained on tape applying surface 85a and 85d by continuing suction through ports 106a and 106d, respectively. The vacuum is constant because of the crescent shaped constant vacuum port manifold 100 which permits uninterrupted communication between manifold access holes 107a and 107d as rotation of applicator wheel 85 takes place. As is also shown in FIG. 12, manifold access holes 107b and 107c are not in alignment with either manifold 100 or 101, therefore, atmospheric pressure only is present in ports 106b and 106c.

While, as mentioned above, vacuum pressure plays a primary role in maintaining tape "T" on tape applying surfaces 85a and 85d, the possibility of misalignment or skewing of the tape is nevertheless present. In order to support and align tape "T" during rotation of applicator wheel 85, the opposing walls of splice block 51 between which applicator wheel 85 is mounted define first and second supports which lie flush with and overlap the tape carrying surfaces of applicator wheel 85 on both its axial sides. Since splice block 51 moves in unison translation with applicator wheel 85, these flush surfaces ensure that tape "T" stays in precise alignment on surfaces 85a and 85d during application of tape "T" onto the applicator wheel surfaces 85a–d and during rotation of applicator wheel 85. At the point in the rotation of applicator wheel 85 illustrated in FIG. 12, rack 71 is stationary.

Referring now to FIG. 13, applicator wheel 85 has now rotated precisely 90° from its position in FIG. 10. Tape carrying surface 85a now faces downwardly and is parallel with the two tapes to be spliced, "A" and "L". Rack gear 92 has rotated to the maximum extent possible. Consequently, no further downward movement of splice block 51 can be converted to rotation of applicator wheel 85. Still referring to FIG. 13, tape carrying surface 85c has rotated forward and is now covered with splicing tape "T". Manifold access hole 107c is in alignment with constant vacuum port 100. Vacuum is therefore retaining tape "T" on surface 85c. Tape "T" carried by tape carrying surface 85d is likewise in communication with constant vacuum port manifold 100 through manifold access hole 107d. Since tape carrying surface 85b is not in position to receive tape "T", only atmospheric pressure is present in port 106b. In the position shown in FIG. 13, manifold access hole 107a is now in alignment with variable pressure port manifold 101. Vacuum is still being supplied to variable pressure port manifold 101 through the cooperation of solenoid valves 143 and 144, as described above.

To effect a completely uniform and secure splice, it is important that tape carrying surface 85a impacts tapes "A" and "L" in a completely flush, parallel position. Therefore, parallel relation between tape carrying surface 85a and splice bed 130 is established at the position shown in FIG. 13. A shoulder 51a on splice block 51 below the spool of splicing tape 31 is shown in its course of downward movement slightly above the upper surface of rack mounting block 70 and in exact alignment with head 78 of rack 71. The upper surface of rack mounting block 70 defines the limit of downward movement of splice block 51 since impact therebetween prevents any further downward movement. Head 78 of rack 71 is adjustable so that the distance it projects upwardly above the upper surface of rack mounting block 70 can be varied to ensure that tape carrying surface 85a is exactly parallel to splice bed 130 at the position shown in FIG. 13.

Referring now to FIG. 14, splice block 51 has continued downwardly to its maximum extent of downward travel, with shoulder 51a flush with the upper surface of rack mounting block 70. In so doing, rack 71 has been moved downwardly causing head 78 to retract. As is evident, movement of rack 71 under the direct impact of splice block 51 is unison therewith, causing rack 71 to move downwardly at exactly the same speed as rack gear 92 and applicator wheel 85. The instant cessation of rotary movement of applicator wheel 85 therefore maintains tape carrying surface 85a in exact parallel position to properly apply tape "T" to abutted tapes "A" and "L". At the exact instant of impact between tape carrying surface 85a and splicing bed 130, solenoid 143 switches from negative air pressure source 147 to pressurized air source 146 by connecting valve ports 143a and 143c. Positive air pressure flows through variable pressure port manifold 101 into manifold access hole 107a and through port 106a, blowing tape "T" off of tape carrying surface 85a and into contact with tapes "A" and "L".

The advantage of blowing tape "T" off of the tape carrying surface 85 is illustrated in FIGS. 16 and 17. FIG. 16 illustrates a hypothetical prior art device with a leader "L" held onto a splice bed by suction as in the present invention. Though exaggerated, FIG. 16 illustrates that the leader directly over a vacuum port is drawn downwardly slightly into the port. This creates a space directly above this indention to which the splicing tape "T" will not be affixed as it is applied. This is true with the use of any type of mechanical splicing tape applicator, whether the splicing tape is held on the applicator by suction or by some other means. However, the problem is particularly severe when the splicing tape itself is deformed upwardly by suction as is shown in FIG. 16. In some cases, the weakness in the splice caused by the lack of adhesion in these recessed areas is sufficient to cause the splice to break either immediately or at some subsequent time during winding, rewinding or playing the tape.

In accordance with the present invention, FIG. 17 illustrates that positive air pressure through ports 106a causes splicing tape "T" to conform to the irregularities caused in leader "L" as a result of the action of the suction through vacuum ports 132. This results in a much stronger splice which is far less susceptible to separation during subsequent processing or use. It has also been observed that removal of the splicing tape "T" from tape carrying surface 85 by positive air pressure reduces the tendency of the tape to partially separate from leader "L" and tape "A" when applicator wheel 85 begins its upward movement.

Referring now to FIG. 15, splicing tape "T" has been applied to the abutted leader "L" and tape "A". Solenoid valve 142 has deactivated valve ports 142c and 142a, and simultaneously activated valve ports 142d and 142b. Up piston supply tube 61 supplies pressurized air to splice cylinder 54 causing splice piston rod 58 to retract into cylinder 54, driving the splice block 51 upwardly. As splice block 51 moves upwardly, rack 71 under the urging of spring 78 returns to its normal, raised position, rack 71 and applicator wheel 85 move vertically upward in unison.

As splice block 51 moves upwardly, rack gear 92 rotates in a counterclockwise direction. Because of the counterclockwise direction of movement of rack gear 92, pawl 93 slides up over one of the teeth of ratchet 90, thereby enabling ratchet 90 to turn while permitting applicator wheel 85 to remain stationary. Positive pressure continues for an instant after splicing tape "T" is applied, in order to keep dirt and debris out of the flow path, then solenoid 145 activates valve connection 144c and 144a so that only atmospheric pressure is present in port 106a. Tape carrying surface 85d now becomes the surface which will actually apply the splicing tape "T" during the next splicing operation. Rack gear 92 continues its counterclockwise rotation as splice block 51 moves upwardly, until rack gear 92 and splice block 51 have again assumed the position shown in FIG. 10. At this point, the steps described above repeat when the electronic control system next activates the splicing mechanism.

In the embodiment described herein, the splicing tape spool 31 moves in unison with splice block 51. An additional length of splicing tape is pulled onto the applicator wheel 85 during the downward movement of splice block 51, as illustrated in FIG. 12. However, in an alternative embodiment, splicing tape spool 31 could be mounted on the front panel 12 of winder 10 in which case splicing tape "T" would be dispensed onto applicator wheel 85 either during the downward movement illustrated in FIG. 12, or the upward stroke illustrated in FIG. 15, depending upon the position of spool 31. By preventing applicator wheel 85 from rotating during the upward movement of splice block 51, each successive tape carrying surface is in turn provided with a length of tape and maintained in the correct position to apply the length of splicing tape during the next reciprocation downwardly of applicator wheel 85.

Applicator wheel 85 may be constructed of a number of suitable materials. In the embodiment described herein, applicator wheel 85 is fabricated from a block of high density polyurethane which while relatively hard (60 durometer) is nevertheless slightly yieldable under pressure so that shock from the impact of applicator wheel 85 against splicing bed 130 is absorbed in the slight compression of the polyurethane. Likewise, fitting the applicator wheel against manifolds 100 and 101 is more easily accomplished, since any minute irregularities in either adjacent surface can be accommodated much more easily than if two hard metal surfaces were in contact. In addition, since the applicator wheel 85 is relatively small, its fabrication is much easier than would be the case if it were made of stainless steel or some other hard metal. The polyurethane material is easily drilled to form manifold access holes 107a–107d. A very small saw is used to cut ports 106a–106d into the four tape carrying surfaces 85a–85d, and the blade access slots 104.

A tape splicer is described above. Various details of the invention may be changed without departing from its scope. Furthermore, the foregoing description of a preferred embodiment according to the present invention is provided for the purpose of illustration only and not for the purpose of limitation—the invention being defined by the claims.

I claim:

1. A method for applying splicing tape to two tape ends, comprising the steps of:
   (a) releasably dispensing splicing tape onto a splicing tape applicator having at least one planar tape carrying surface with an underlying port therein exerting negative air pressure on the splicing tape to retain it on the tape carrying surface;
   (b) positioning two opposing tape ends closely adjacent to and in longitudinal alignment with each other and in splicing tape receiving position relative to said splicing tape applicator and holding said two opposing tape ends in splicing tape receiving position by means of negative air pressure applied to the side of said tapes opposite from the side to which the splicing tape is applied;
   (c) moving said splicing tape applicator momentarily into contact with the two adjacent tape ends thereby applying said splicing tape to said tape ends; and,
   (d) directing positive air pressure from said port against the underside of said splicing tape as the splicing tape is applied to said tape ends to aid in removing the splicing tape from the tape carrying surface of the splicing tape applicator and further to aid in firmly adhering the splicing tape to the adjacent tape ends without gaps or bubbles in the splice.

2. A method according to claim 1 and including the step of retaining the splicing tape on the tape carrying surface until applied to the two tape ends by means of negative air pressure through said port whereby said splicing tape is releasably urged against said tape carrying surface.

3. A method according to claim 1 wherein the splicing tape is dispensed onto said tape applicator and thereafter cut to length.

4. A method for applying splicing tape to two tape ends, comprising the steps of:
   (a) releasably dispensing splicing tape onto a splicing tape applicator having at least one planar tape carrying surface with an underlying port therein and retaining said splicing tape on said tape carrying surface until applied to the two opposing tape ends by means of negative air pressure through said port whereby the splicing tape is releasably urged against said tape carrying surface;
   (b) cutting the splicing tape to a length substantially coextensive with the length of the tape carrying surface of said tape applicator;
   (c) positioning two opposing tape ends closely adjacent to and in longitudinal alignment with each other and in splicing tape receiving relation to said splicing tape applicator and holding the two opposing tape ends in splicing tape receiving relation by means of negative air pressure applied to one side thereof;
   (d) moving said splicing tape applicator momentarily into contact with the two adjacent tape ends and applying the splicing tape to the tape ends; and,
   (e) directing positive air pressure from said port against the splicing tape as the splicing tape is applied to the tape ends to aid in firmly adhering the splicing tape thereto without gaps or bubbles in the splice.

5. A method according to claim 4, wherein said splicing tape applicator comprises a polygonal applicator wheel having a plurality of peripheral, tape carrying planar surfaces for holding the splicing tape, each tape carrying surface having a port therein adapted for selectively applying positive or negative air pressure; said applicator wheel being mounted for simultaneous rotational and vertical movement into and out of contact with the two opposing tape ends.

6. In an apparatus for winding magnetic recording tape into a cassette, comprising a drive spindle for receiving and rotating one of the cassette spools for winding a pre-determined length of magnetic recording tape from a supply reel into the cassette; means for cutting the cassette leader tape and magnetic recording tape and placing their respective free ends in position to receive a length of splicing tape; and means for ejecting a cassette wound with recording tape from the drive spindle and replacing the cassette with an empty one, the combination therewith of a splicing for applying adhesive splicing tape to the two tape ends, and comprising:
   (a) a source of splicing tape;

(b) a splicing tape applicator having at least one planar tape carrying surface;

(c) means for reciprocating said splicing tape applicator into and out of momentary contact with two tape ends positioned in splicing tape receiving relation to said splicing tape applicator;

(d) port means communicating with said tape carrying surface of said splicing tape applicator;

(e) a source of positive and negative air pressure for selective communication with said port means;

(f) air pressure control means for applying negative air pressure through said port means to hold the splicing tape on the tape carrying surface, positive air pressure through said port means to said splicing tape to aid in removing the splicing tape from the tape carrying surface and firmly adhering the splicing tape to the tape ends without gaps or bubbles in the splice; and, (g) means for exerting negative air pressure on the free ends of the recording tape and leader tape to hold them in position until the splicing tape is applied thereto.

7. The combination according to claim 6 wherein said port means comprises two elongate, laterally spaced-apart slots for impinging on said splicing tape along a substantial portion of the length and width thereof.

8. The combination according to claim 6 and including means for permitting selective communication of said source of negative air pressure with said port means to hold the splicing tape on the tape carrying surface until the instant of contact with the tape ends and wherein said air pressure control means includes a solenoid operated valve for interconnecting said port means selectively with said source of positive air pressure and said source of negative air pressure.

9. The combination according to claim 6 wherein said splicing tape applicator comprises a polygonal wheel having a plurality of peripheral, tape carrying planar surfaces for holding the splicing tape, said applicator wheel being mounted for simultaneous rotational and vertical movement into and out of contact with the two opposing tape ends.

10. The combination according to claim 9 wherein said applicator wheel cmprises four tape carrying surfaces collectively defining a square.

11. The combination according to claim 9 and including means for interrupting positive and negative air pressure to said port means of any tape carrying surface not then covered with splicing tape.

* * * * *